(12) United States Patent
Donaldson

(10) Patent No.: US 7,637,055 B2
(45) Date of Patent: Dec. 29, 2009

(54) HYDROPONICS PLANT SUPPORT SYSTEM

(76) Inventor: Michael Tavis Donaldson, P.O. Box 1301, Gualala, CA (US) 95445

( * ) Notice: Subject to any disclaimer, the term of this patent is extended or adjusted under 35 U.S.C. 154(b) by 0 days.

(21) Appl. No.: 11/998,208

(22) Filed: Nov. 28, 2007

(65) Prior Publication Data
US 2009/0133326 A1 May 28, 2009

(51) Int. Cl.
*A01G 31/00* (2006.01)
*A01G 9/12* (2006.01)
*A01G 17/04* (2006.01)
(52) U.S. Cl. ............... 47/63; 47/45; 47/47; 47/70
(58) Field of Classification Search ............ 47/70, 47/47, 45
See application file for complete search history.

(56) References Cited

U.S. PATENT DOCUMENTS

| | | | | |
|---|---|---|---|---|
| 548,508 A | * | 10/1895 | Bjelland | 47/47 |
| 1,536,678 A | * | 5/1925 | Markowski | 47/47 |
| 1,771,207 A | * | 7/1930 | Coscioni | 47/47 |
| 2,011,990 A | * | 8/1935 | Aldridge | 47/47 |
| 2,083,526 A | * | 6/1937 | Rinker | 47/47 |
| 2,083,678 A | * | 6/1937 | Wilson | 47/47 |
| 2,244,995 A | * | 6/1941 | Klaassen | 224/186 |
| 3,136,510 A | * | 6/1964 | Bowers et al. | 248/27.8 |
| 3,165,863 A | * | 1/1965 | Duran | 47/47 |
| 5,473,839 A | * | 12/1995 | Stidham | 47/47 |
| 5,778,597 A | * | 7/1998 | Klevstad | 47/47 |

* cited by examiner

*Primary Examiner*—Son T. Nguyen
(74) *Attorney, Agent, or Firm*—Risto A. Rinne, Jr.

(57) ABSTRACT

An apparatus for supporting plant foliage includes a base assembly that is placed in a growing medium. A plurality of support members are attached to the base assembly and extend radially away from a plant center and vertically. Additional linear extension segments are detachably-attached, as desired, to an upper end of any support member to provide increased vertical height. Additional radius extension segments are similarly detachably-attached to the upper end of any support member to provide increased radial displacement. The linear extension segments can be attached to the upper portion of other extension segments or the upper portion of other radius extension segments. The radius extension segments can be similarly attached. Plant ties that do not over tighten the plants and which permit easy attachment and removal are disclosed. A telescopically extensible top segment that prevents injury to a user is disclosed.

10 Claims, 2 Drawing Sheets

HYDROPONICS PLANT SUPPORT SYSTEM

BACKGROUND OF THE INVENTION

1. Field of the Invention

The present invention, in general, relates to botany and, more particularly, to hydroponics.

Growing plants indoors and by hydroponics is an important and emerging form of agriculture. The use of UV lighting as a part of hydroponics allows for greater illumination over more hours than is possible by conventional sunlight. Accordingly plant growth, and therefore yields, can be significantly increased for a given amount of time.

Indoor hydroponics allows for predicable growing conditions unaffected by environmental conditions including seasons. Seasonal crops can produce their harvests year-round. Possible frost and freezing during the fall, winter, and spring months are not an issue. There is no damage to foliage from winds that can injure the plant (or vine, bush, or tree) and lessen yields when it is grown indoors. Pests are more easily controlled. In summary, there are many advantages that hydroponics can provide.

However, there are problems with hydroponics. For example, as hydroponically grown plants grow especially fast, they are stringier and less stable. Their stems are thinner and they tend to produce larger fruit than by conventional growing methods. The heavier fruits put a strain that the thinner stems may not be able to support. Therefore, the plant stems may require additional support.

Also, the cost of electricity to run indoor lighting is expensive. It is desirable to maximize the benefits of the lighting that is used. The lighting is typically set up on an overhead track. The positioning of the lights may be fixed or motor controlled and variable on any axis (x, y, z). As the plants grow they tend to accumulate near the bottom where a growing medium is located. As they congregate together the uppermost foliage blocks light from reaching lower areas.

This impedes photosynthesis and thereby retards plant growth. It also wastes electricity that is used to inefficiently energize the UV lights that are not adequately illuminating the lower foliage.

The darkness under the foliage canopy and the moisture that is present creates a tendency for mold, mildew, and possibly fungus to form underneath the foliage canopy. The mold, mildew, and fungus can cause damage to the plants and also to the crops and fruits that are produced.

It is desirable to open the plants up so that the radiant UV light can reach the lower portions of the plants. This is accomplished by spreading and maintaining the stems into a more open orientation. A more open positioning will promote optimum continued plant growth and it will also retard the formation of mold or mildew. It also allows for less lighting to be used thereby saving electricity.

However, as the plants continue to rapidly grow, it is important to remember that the stems are thinner and that they will require continued additional support. It is important to support the fragile, thinner stems in a way that does not pinch or otherwise injure them. Prior art methods of securing the stems to any support structure can overly pressure them.

However, in a short period of time it will again become necessary to once again reposition them and open them up in additional ways in order to continue to permit illumination to reach the lower portions of the plants. In other words, a frequent, periodic repositioning of the plant stems, foliage, and emerging fruit is required.

Prior art methods of securing hydroponic plants to a supporting structure have failed to meet the needs of the hydroponic farmer. Obviously, plants start small and, hopefully, continue to grow and become large. The principal type of prior art support is commonly sold as a tomato cage. It has a cone shaped wire grid structure and is of fixed size and shape. All known support structures have a fixed overall size and shape.

Understanding that the plant will start small and grow large this creates a tradeoff in determining how large of a plant support structure to use. If a plant support structure that is large enough to accommodate the size of the plant when fully grown is used then it is difficult or virtually impossible for a user to reach down into the structure and secure the plant during its earlier stages of growth.

If a plant support structure that is small enough to permit easy access for a user to reach a smaller plant is used, then the structure will not provide a sufficient amount of the outer or upper support that is required to accommodate the growth of the plant.

Also other types of plant supports are not intended for use with hydroponics where plant growth is quick and where thinner stems tend to accumulate at or near the bottom. These prior art types of plant supports do not provide for sufficient radial expansion to occur right at the bottom of the plant where it is needed for hydroponically grown plants. Neither do they provide the flexibility to extend upward while increasing radial extension. Both are needed to ensure that rapidly growing hydroponic plants are disposed in an open way to allow light to penetrate to the bottom and also to support the thinner stems along their longitudinal length.

There is another problem with prior art types of plant supporting structures. The members that extend upward have sharp ends that can cut or puncture the user who is trying to reach downward. Worse yet, there is the very real danger that in a moment of carelessness the user can reach downward and possibly poke an eye.

Also, the prior art devices used to secure plants to the structural support members are generally known as various types of "plant ties". These are a type of fastener that are used to secure a plant stem to the structural support member. It is difficult to apply or to remove the prior art types of fasteners (i.e., plant ties). They are time consuming to apply or remove and they can damage the plants.

It is important to note that with fast-growing hydroponic plants, the need to remove the plant ties and reposition the plants is frequent. Therefore, the plant ties must be undone, the plants moved, and then secured again to the structural support members in a new position.

Certain of the prior art types of plant ties are made of wire that is twisted around the stem and support member. Wire plant ties are not suitable for many plants because they can cut or otherwise damage the stems, especially the fragile stems of hydroponically grown plants. If they are twisted too tight, they can actually cut, girdle, or even sever the stem.

Other types of plant ties include a hook and loop backed strip of material that is sold under the VELCRO trade name and is wrapped around both the plant stem and the stem support member. These must be wrapped around both the stem and the support member and an excess length of overlapping material is then pressed together. It takes time to wrap the strip around the plant stem and support member and to align the overlapping portion with a portion of the strip that is underneath. Then the upper overlap must be pressed down on the lower portion. This action can apply too great of a pressure to the stem, possibly crushing a softer, weaker stem such as is common with hydroponically grown plants.

When removing any of the prior art devices a user can easily contact and gouge the plant stem or cause friction to the stem which can damage the stem and reduce yield. It also takes an excessive amount of time to undo the prior art types of supports. Wire plant ties must be untwisted. The end of the hook and loop type must first be located. Then a user must force the end up thereby separating the hook portion from the loop portion until a sufficient amount of the strip has been separated to permit the user to peel the hook portion from the loop portion of the remaining overlap.

Also, prior art structures do not sufficiently open up the plant (i.e., extend the plant outward, radially) so that the UV light can illuminate the lower portions of the plant. Additionally, the degree or magnitude of opening radially that needs to occur can vary by plant species and even plant to plant as it grows. Prior art supports do not provide a capability to open the plants radially to a varying degree while simultaneously providing a vertically expandable support structure as is optimally required to accommodate the resultant vigorous plant growth that then occurs.

It is important to note that virtually any desired plant or shrub or even tree can be grown by hydroponic methods. The changing laws of supply and demand dictate which types of flora are best suited for hydroponic growing at any given time. However, regardless of what species of plant is being grown hydroponically, the above-mentioned difficulties exist.

Accordingly, there exists today a need for a hydroponics plant support system for growing plants hydroponically that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and are not be specifically mentioned herein.

Clearly, such an apparatus would be a useful and desirable device.

2. Description of Prior Art

Plant support structures are, in general, known. For example, the following patents describe various types of plant support devices:

U.S. Pat. No. 6,299,125 to Zayeratabat, that issued on Oct. 9, 2001;

U.S. Pat. No. 6,209,258 to Schneider, that issued on Apr. 3, 2001;

U.S. Pat. No. 5,870,854 to Wilkins, that issued on Feb. 16, 1999;

U.S. Pat. No. 5,711,107 to Louisiana, that issued on Jan. 27, 1998;

U.S. Pat. No. 5,542,209 to Sheu, that issued on Aug. 6, 1996;

U.S. Pat. No. 5,349,780 to Dyke, that issued on Sep. 27, 1994;

U.S. Pat. No. 5,327,678 to Schweiker, that issued on Jul. 12, 1994;

U.S. Pat. No. 5,282,335 to Holtkamp, Jr., that issued on Feb. 1, 1994; and

U.S. Patent Application Publication No. 2005/0044786 A1 to Mastronardi that published on Mar. 3, 2005.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a hydroponics plant support system that reduces the demand for electrical energy.

It is also an important object of the invention to provide a hydroponics plant support system that more effectively utilizes available lighting.

Another object of the invention is to provide a hydroponics plant support system that increases the amount of photosynthesis that occurs in a given period of time.

Still another object of the invention is to provide a hydroponics plant support system that reduces mold, mildew, or fungus.

Still yet another object of the invention is to provide a hydroponics plant support system that provides a structure for supporting plant stems.

Yet another important object of the invention is to provide a hydroponics plant support system that allows for foliage of a plant to be secured to support members of the support system which secure at least some of the foliage of the plant in a position that is disposed radially away from a plant center a distance that is greater than would otherwise occur without benefit of the support system.

Still yet another important object of the invention is to provide a hydroponics plant support system that is able to secure plant foliage in a desired position.

A first continuing object of the invention is to provide a hydroponics plant support system that is able to secure plant foliage in a desired first position at a first time and which permits repositioning the plant foliage in a desired second position at a second time.

A second continuing object of the invention is to provide a hydroponics plant support system that is able to secure plant foliage in a desired first position at a first time and which permits repositioning the plant foliage in a desired second position at a second time and wherein the second position includes at least some of the plant foliage that is disposed further away from a plant center than in the first position.

A third continuing object of the invention is to provide a hydroponics plant support system that is able to secure plant foliage in a desired first position at a first time and which permits repositioning the plant foliage in a desired second position at a second time and wherein the second position includes at least some of the plant foliage that is disposed at a greater elevation than in the first position.

A fourth continuing object of the invention is to provide a hydroponics plant support system that helps prevent damage to the foliage when it is secured to support members of the support system.

A fifth continuing object-of the invention is to provide a hydroponics plant support system that helps prevent friction from damaging the foliage when it is secured to support members of the support system.

A sixth continuing object of the invention is to provide a hydroponics plant support system that helps prevent a pinching or cutting of the foliage when it is secured to support members of the support system.

A seventh continuing object of the invention is to provide a hydroponics plant support system that helps reduce the risk of injury to a user of the plant support system.

An eighth continuing object of the invention is to provide a hydroponics plant support system that helps reduce the risk that a user of the plant support system might be poked or have any part of their body punctured by any of the support members of the support system during use.

Briefly, a hydroponics plant support system that is constructed in accordance with the principles of the present invention has a base assembly that is placed in a growing medium. A plurality of support members are attached to the base assembly. Each support member includes a first radius that has a beginning and an end. The beginning of the first radius is disposed above the medium. The first radius changes a direction of a longitudinal center of the support member so that, when passing from a bottom of the support member upward, the support member is disposed further away from a plant center at the end of the first radius than at the beginning thereof. A first segment that includes a first end and an opposite second end is attached, at a first end of the first segment, to the end of the first radius. The first segment continues from the end of the first radius and extends radially away from the plant center. A second radius includes a second radius beginning and a second radius end. The second radius beginning is disposed at the second end of the first segment and the second radius changes the direction of the longitudinal center of the support member for a second time so that it is disposed more vertically at the second radius end than at the second radius beginning. Additional linear extension segments are attached, as desired, to an upper end of each support member to provide increased vertical height. Additional radius extension segments are attached, as desired, to an upper end of each support member to provide increased radial displacement of the support member away from the plant center. A top segment that includes a mushroom-shaped safety cap is preferably placed atop each of the support members. To secure the plant foliage to the support members a plurality of plant ties are wrapped around both the plant stem and the support member at desired positions. The plant ties each include a flexible segment of a predetermined length that is sufficiently long to prevent pinching or binding or cutting of the foliage. A first pad containing a first half of a hook and loop fastener is disposed at a first end of the flexible segment. A second pad containing a second half of a hook and loop fastener is disposed at an opposite second end of the flexible segment. The first and second pads are pressed together to secure the flexible segment in position around the stem and the support member. When the plant grows, the first and second pads are pulled apart to release the foliage from the support members. The top segments are extended or, if necessary, are removed and an additional linear extension segment and/or radius extension segment is added, as desired. The top segments are replaced and the plant ties are again used to secure the foliage in a new, second position. This process is repeated, as desired, throughout the growing cycle of the plant.

DETAILED DESCRIPTION OF THE INVENTION

Figure 1:
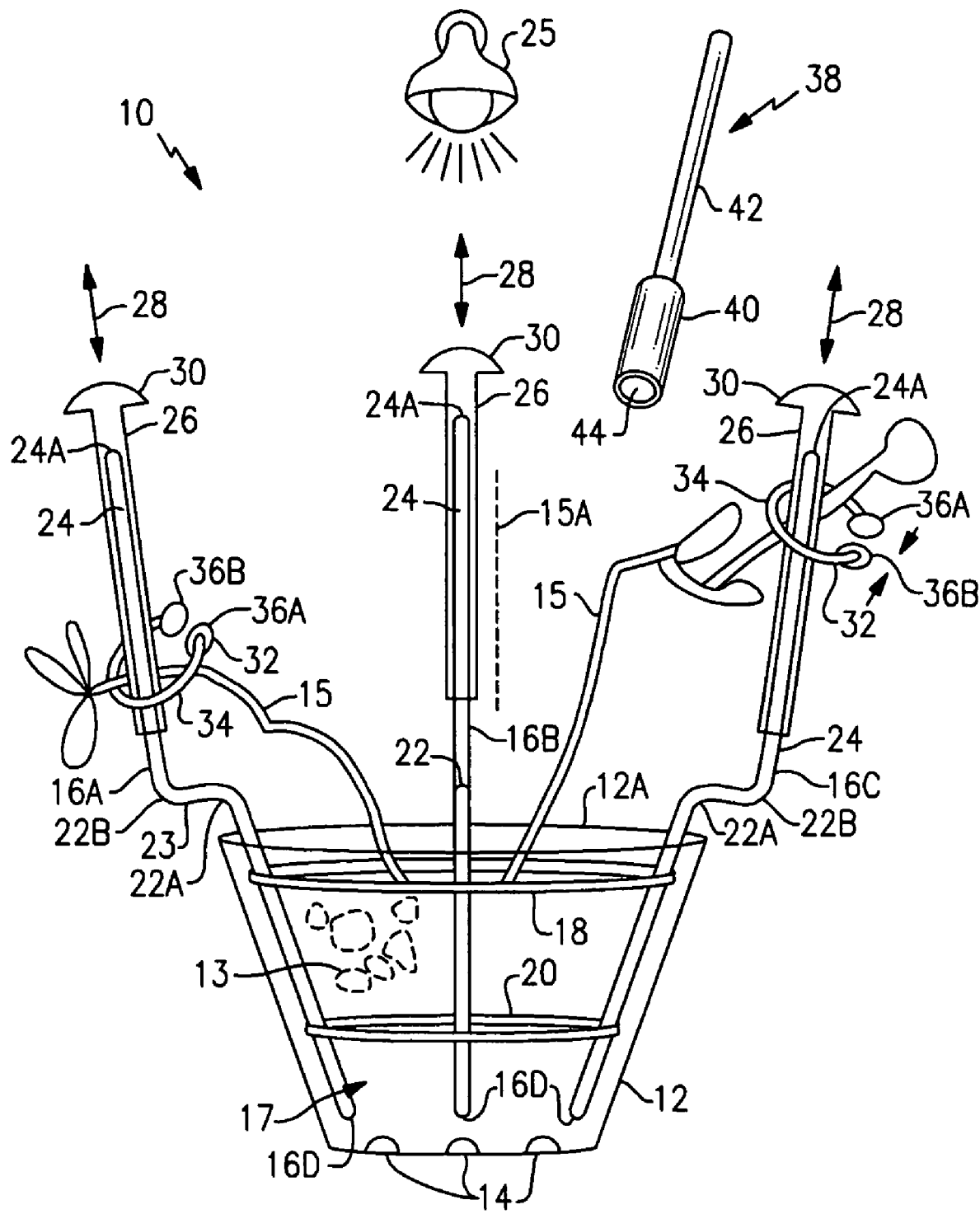
FIG. 1 is a view in perspective of a hydroponics plant support system disposed in a hydroponic pot.
Figure 2:
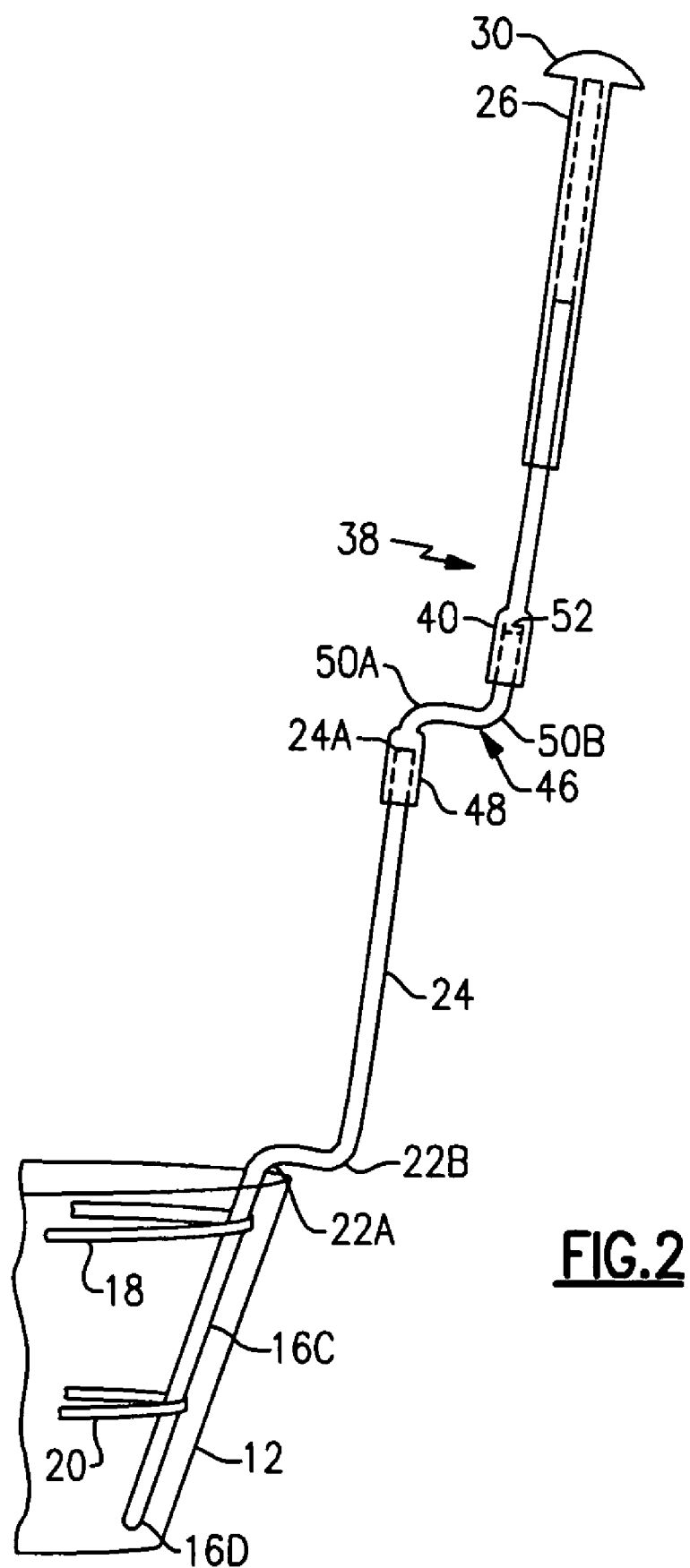
FIG. 2 is a partial view in perspective of the hydroponics plant support system of FIG. 1 including an extension segment and a radius extension segment.

Referring to FIG. 1 and on occasion to FIG. 2 is shown, a hydroponics plant support system, identified in general by the reference numeral 10.

A hydroponic pot 12 of any preferred size, type, or configuration is used that is somewhat similar to other types of plant pots and which has an abundance of drain holes 14. The drain holes 14 permit irrigation water to easily flow out of the hydroponic pot 12, as needed.

A growing medium, shown in dashed lines and identified by the reference numeral 13, is disposed in the hydroponic pot 12. The growing medium 13 includes any acceptable component or combination of components that can be used for hydroponics. A well-known growing medium 13 includes rocks. Another growing medium 13 includes rock wool or a combination of rocks and rock wool. As is the nature of hydroponics, the growing medium 13 is other than the normal types of soil that conventional agricultural methods employ.

A plant center 15a (dashed line) includes a vertical line that extends upward from a geometrical center of the plant 15. Typically, the plant 15 is also disposed near the geometrical center of the hydroponic pot 12 for optimum spacing. When the plant 15 is in the center of the hydroponic pot 12 the plant center 15a also aligns with a geometrical center of the hydroponic pot 12.

For the purpose of disclosure whenever the noun "plant 15" is used herein, it is intended to refer to and to include any desired species of the plant kingdom including bushes, trees, vines, shrubs, and all other manner of vegetable or other types of plants or crops that can be grown hydroponically.

A plurality of plant support members 16a, 16b, 16c are attached to and extend upward from a base assembly, identified in general by the reference numeral 17. Although any number of plant support members 16a-c can be used, it is expected that for most applications from about 5 to about 8 of the plant support members 16a-c are sufficient. The number of plant support members 16a-c will vary depending on the size and type of the plant 15.

The base assembly 17 includes an upper support band 18 and a lower support band 20 that are parallel with respect to each other and disposed in a spaced apart relationship. A lower portion of each of the plant support members 16a-c is attached to the upper support band 18 and is also attached to the lower support band 20. Accordingly, the upper and lower support bands 18, 20 and the plant support members 16a-c are each maintained in position relative to one-another.

The base assembly 17 includes the upper support band 18 and the lower support band 20 as well as that portion of each of the plant support members 16a-c that is disposed below a first radius 22a. Therefore, the base assembly 17 is disposed generally in the hydroponic pot 12 and the greater portion of the base assembly 17 is disposed in the growing medium 13. The growing medium 13 secures the base assembly 17 in position. The base assembly 17 then provides the structural support and stability to the remaining portion of each of the plant support members 16a-c so that they can be useful in supporting and also locating the foliage of the plant 15 where desired.

The upper support band 18 preferably includes a larger diameter than does the lower support band 20. Accordingly, the lower portion of each of the plant support members 16a-c, which are generally linear segments, combine together to provide a generally conical shape for the base assembly 17 that resembles a frustum of a cone.

The conical shape of the base assembly 17 corresponds with the generally conical shape of the hydroponic pot 12. The base assembly 17 includes a size (i.e., an outside diameter) that is slightly less than an inside diameter of the hydroponic pot 12 and a height that is sufficient for an upper end of each of the plant support members 16a-c to be disposed above a rim 12a of the hydroponic pot 12 when the base assembly 17 is disposed in the hydroponic pot 12.

After insertion of the base assembly 17 in the hydroponic pot 12 is accomplished, the growing medium 13 is placed in the hydroponic pot 12 and a root system (not shown) of the plant 15 is disposed in the growing medium 13. The growing medium 13 secures the base assembly 17 in position in the hydroponic pot 12. It also secures the plant 15 in the hydroponic pot 12.

Although hydroponic growing methods vary, in general, the hydroponic pot 12 is placed in a larger container (not shown). A water and nutrient mixture (or only water, if desired) is periodically allowed to flow into the container. The water and nutrient mixture flows into the hydroponic pot 12 through the drain holes 14 until it is disposed at the same elevation inside and outside of the hydroponic pot 12. The water and nutrient mixture mingles with the growing medium 13 and the plant 15 roots. In this manner, the water and nutrient mixture irrigates and feeds the root system of the plant 15.

The water and nutrient mixture is then allowed to drain from the container (i.e., the water level in the container is first lowered or allowed to drain) which correspondingly causes the water and nutrient mixture to drain out of the growing medium 13 and exit the hydroponic pot 12 through the drain holes 14.

In this manner the plant 15 is periodically irrigated and fed. If preferred, other methods may be used to irrigate and feed the plant 15, for example by use of a drip or other type of irrigation system that is disposed above the growing medium 13. In these alternative instances the water and nutrients are initially provided to the top of the growing medium 13 and allowed to flow downward through the growing medium 13 and out the drain holes 14.

The lower first radius 22a of each plant support member 16a-c includes a beginning portion thereof that is disposed nearest the plant center 15a and an end portion thereof that is disposed further away from the plant center 15a than the beginning portion. The beginning portion of the first radius 22a is disposed immediately above the rim 12a and above growing medium 13.

The first radius 22a changes a direction of a longitudinal center of the plant support member 16a-c so that, when passing from a bottom of the plant support member 16a-c upward, a remaining portion of the plant support member 16a-c is disposed further away from the plant center 15a at the end portion of the first radius 22a than at the beginning portion thereof. This is important and its significance is described in greater detail hereinafter.

A first segment 23 that includes a first end and an opposite second end is attached, at a first end of the first segment 23, to the end portion of the first radius 22a. The first segment 23 continues from the end portion of the first radius and extends radially away from the plant center 15a.

A second radius 22b begins at the second end of the first segment 23 and includes a second radius beginning and a second radius end. The second radius 22b changes the direction of the longitudinal center of the plant support member 16a-c for a second time so that it is disposed more vertically after (i.e., above) the second radius 22b than before the second radius 22b.

An upper segment 24 of each of the plant support members 16a-c includes a lower end and an upper end. The lower end of the upper segment 24 is attached to an uppermost part of the second radius 22b. The upper segment 24 extends upward and, preferably, in a direction that is disposed increasingly further away from the plant center 15a as the upper segment 24 rises in elevation.

This continues to extend the generally conical overall shape of the hydroponics plant support system 10 upward. The portion of the hydroponics plant support system 10 that is disposed above the second radius 22b also generally resembles a frustum of a cone in overall shape (as does the portion that is disposed below the first radius 22a).

The upper segment 24 of each plant support member 16a-c is linear and includes a longitudinal length.

It is important to note that any preferred material can be used to form any portion of the hydroponics plant support system 10. If the plant support members 16a-c are formed of a malleable material, such as a type of metal, it is possible for a user to urge an upper portion of each of the upper segments 24 either further away from the plant center 15a or closer to the plant center 15a, as desired, to accommodate the size and shape of the plant 15 that is being grown. This is generally preferred although other non-malleable materials can, of course, be used as well.

An artificial light 25 is disposed over the plant 15, as desired. The light 25 can be fixed in position or its location can be movable. The light 25 can be mounted on a track and it can be capable of movement along an x, y, and z axis, if desired. Movement along a z axis would include vertical displacement relative to the plant 15 and is used to control the intensity of light that is reaching the plant 15. The light 25 typically produces a significant quantity of UV radiation as that bandwidth is especially conducive to promoting growth of the plant 15.

Each of the upper segments 24 includes an upper end 24a. Each of the plant support members 16a-c begins in the hydroponics pot 12 at a lower plant support member end 16d that is disposed below the lower support band 20. The plant support members 16a-c continue upward and outward including the first radius 22a and the second radius 22b and the upper segment 24. Each of the plant support members 16a-c terminates at the upper end 24a.

If a user is bending down or reaching down into the area that is disposed between the upper ends 24a (i.e., toward the growing medium 13) there is risk that the upper end 24a could poke or even puncture the user. If user does not see one of the upper ends 24a while bending forward the upper end 24a could forcefully contact an eye of the user. If this were to occur, the potential for serious injury is substantial.

A top segment 26 is preferably placed over each of the upper segments 24. While generally preferred, use of the top segment 26 is optional and may not be needed for smaller versions of the hydroponics plant support system 10. The top segment 26 has a longitudinal length with an inside diameter that is generally slightly greater than an outside diameter of the upper segments 24.

Of course, the upper segments 24 can have any preferred cross-sectional shape including round, square, rectangular, polygonal, or otherwise. The cross-sectional shape of the top segment 26 is varied accordingly so that it can cooperate with the shape of the upper segment 24.

Accordingly, the top segment 26 is able to telescope up and down along the longitudinal length of the upper segments 24 in a direction as shown by arrows 28. Friction between the top segment 26 and the upper segment 24 is sufficiently great to retain the top segment 26 at whatever position it has been urged to relative to the upper segment 24.

The desired amount of friction is established by controlling the tolerance between the inside diameter of the top segment 26 with respect to the outside diameter of upper segments 24 and by the static coefficient of friction that exists between the materials which are used to form each respective member.

In this manner the overall combined length of the upper segment 24 and the top segment 26 is a variable that can be adjusted to suit for each of the plant support members 16a-c. A small amount of overlap by the top segment 26 over the upper segment 24 is, of course, necessary to retain the top segment 26 in position and to provide sufficient structural support for an upper assembly portion consisting of the top segment 26 and each of the respective plant support members 16a-c.

The overall combined length of the upper assembly portion is varied at each plant support member 16a-c to provide the necessary support, as is described in greater detail hereinafter, for the plant 15 in accordance with the size of the foliage that is proximate each of the respective plant support members 16a-c. In this manner it is possible for one of the top segments 26 to be urged down fully onto the upper segment 24 while another of the top segments 26 is urged maximally-upward, while certain other of the top segments 26 are disposed somewhere in-between.

The top segment 26 includes an enlarged mushroom-shaped safety cap 30. The safety cap 30 includes a diameter that is larger than the diameter of the top segment 26. It is gently curved at the top to minimize the risk of harm if it is inadvertently contacted by the user. Accordingly, the risk of puncturing the user is eliminated.

The safety cap's 30 larger diameter also provides a few additional and unexpected benefits. First, the safety cap 30 makes it considerably easier for the user to see it when bending forward. Therefore, the user is less likely to strike it than they would be to strike the upper end 24a of one of the upper segments 24. Second, the safety cap 30 also provides a convenient protrusion that the user can grasp when urging the top segment 26 either toward or away from the hydroponic pot 12, in the direction as shown by arrows 28.

The term "foliage" of the plant 15, as used herein, includes branches, stems, stalks, shoots, leaves, fruit, or any other portion of the plant 15 that is not contained in the growing medium 13. The foliage is detachably-attached (as is described hereinafter in greater detail) to the plant support members 16a-c wherever additional support is deemed to be necessary.

The hydroponics plant support system 10 solves three important needs of hydroponic plant growers simultaneously. First, it secures the foliage to the upper segments 24 and/or to the top segments 26, thereby providing much needed support assistance to the thinner stems and stalks common with hydroponic growing methods.

Second, it disposes the foliage generally away (i.e., radially away) from the plant center 15a. This, in turn, allows more of the UV and other radiation from the light 25 to reach the foliage that is disposed nearer to the growing medium 13 than would otherwise be possible if the foliage were simply secured in a more vertical (and not radially outward) fashion.

The resultant increase in illumination at lower levels reduces moisture, mold, and mildew which promotes healthy disease-free growth of the plant 15. The increase in illumination also results in even more rapid growth of the plant 15 than would otherwise be possible. This is because the foliage at the bottom of the plant 15 is more actively engaged in photosynthesis as a result of receiving greater incident radiation. Fruits that are disposed at lower elevations of the plant 15 also ripen faster and more uniformly.

Thirdly, by disposing the foliage radially away from the plant center 15a, the radiation of the light 25 is more effectively utilized over the entire plant 15 by the foliage. This allows for generally less use of the light 25 which, in turn, reduces electrical demands and increases the efficiency and cost-effectiveness of hydroponics, in general.

To accomplish this, the foliage of the plant 15 is pulled apart and in a direction that is generally away from the plant center 15a. This allows the radiation from the light 25 to reach all the way down to the growing medium 13, promoting optimum growth.

The foliage is urged toward one of the plant support members 16a-c that is closest to the foliage. The foliage is secured to either the upper segment 24 or the top segment 26 by any preferred method.

A preferred method of attachment includes a plant tie 32 that is comprised of a short flexible member 34 that terminates in a first pad 36a at a first end thereof and in a second pad 36b at a second opposite end thereof. The first pad 36a includes a first half of a hook and loop fastener. The second pad 36b includes a second half of a hook and loop fastener.

During use, the foliage is urged into position adjacent the upper segment 24 or the top segment 26 and the plant tie 32 is placed around a stem of the plant 15 and also around either the top segment 26 or the upper segment 24. The first pad 36a is brought into contact with the second pad 36b to secure the plant 15 stem in position.

This provides significant benefits over prior art types of plant ties (not shown). For example, it becomes easy to simply urge and touch the two pads 36a, 36b together. Careful positioning and overlap is not required. It also becomes especially easy to grasp the two pads 36a, 36b or the flexible member 34 and simply pull what has been grasped apart in order to separate the two pads 36a, 36b and allow for removal of the plant tie 32. Excessive tightening of the plant tie 32 around a stem is impossible as the first pad 36a would simply pull apart and separate from the second pad 36b if the force was excessive.

When a prior art type of hook and loop plant tie (not shown) is used, careful overlapping of one end along a longitudinal length of the portion that extends around the stem is required. It is not possible to grasp the prior art type of hook and loop plant tie along its (flexible) length and pull it apart. The overlapping portion must be urged upward, radially away from its center, in order to separate the two ends. The prior art type of hook and loop plant tie can therefore be excessively tightened and, possibly, damage the foliage.

As the plant 15 grows, the plant tie 32 is easily opened and removed, thereby permitting the foliage of the plant 15 to be repositioned as desired.

During repositioning, the user will extend upward as shown by arrows 28 certain of the top segments 26 thereby increasing the overall combined length of the top segment 26 and the upper segment 24. This is done to accommodate the rapid growth of the plant 15, as is desired. After the foliage has been repositioned, each of the plant ties 32 is reapplied at a new location. This process is repeated when necessary.

Certain types of the plant 15 can grow to a length that exceeds the maximum combined (i.e., extended) length of the upper segment 24 and the top segment 26. The hydroponics plant support system. 10 is able to accommodate growth that exceeds the maximum combined length of the upper segment 24 and the top segment 26 by the use of an extension, identified in general by the reference numeral 38. The extension 38 is used at any of the plant support members 16a-c, whenever the size or mass of the foliage requires it to be secured higher than the upper segment 24 and maximally extended top segment 26 can provide.

The extension 38 includes a lower end 40 and an upper portion 42. The lower end 40 includes an enlarged portion that has a greater outside diameter than does the upper portion 42. The lower end 40 includes an opening 44 that includes an inside diameter that is slightly larger than the outside diameter of the upper segment 24. The outside diameter of the upper portion 42 is exactly the same diameter as is the upper segment 24.

To use the extension 38, the plant ties 32 proximate the desired plant support member 16a-c are first removed and the top segment 26 is urged upward and with sufficient force to remove it entirely from the upper segment 24. The opening 44 in a bottom of the lower end 40 is then placed atop the upper end 24a of the upper segment 24 and is urged down as far as the opening 44 will allow insertion to occur. The overlap that occurs is sufficient to retain the extension 38 in position and to provide sufficient structural strength and integrity to secure and maintain a longitudinal center axis of the extension 38 in alignment with a longitudinal center axis of the upper segment 24.

The top segment 26 that was removed is then placed over the upper portion 42 of the extension 38 and is urged downward until the overall combined length of the upper segment 24, the extension 38, and the top segment 26 is as desired.

The foliage is then urged into contact with the upper segment 24, the extension 38, and the top segment 26 and secured thereto by use of a plurality of the plant ties 32.

As the plant 15 continues to grow, the process is repeated with the top segment 26 being extended along the longitudinal length of the extension 38, as desired. If necessary, additional extensions 38 are added on top of previously added extensions 38 in order to provide any desired vertical combined height for the plant support members 16a-c of the hydroponics plant support system 10 sufficient to accommodate the maximum height of the plant 15.

It may also be desirable to urge the abundantly growing foliage of certain types of the plant 15 further outward than is provided by the conical frustum shape of the hydroponics plant support system 10. Referring now in particular to FIG. 2, if desired a radius extension segment, identified in general by the reference numeral 46 is added to an upper end 24a of the upper segment 24 or on top of any of the extensions 38 or even on top of another of the radius extensions 46.

The radius extension 46 includes a bottom radius portion 48 that is identical to the lower end 40 of the extension 38. Accordingly, the bottom radius portion 48 can be disposed over the upper end 24a or over the top of the upper portion 42 of the extension 38.

The radius extension 46 includes a first extension radius 50a and a second extension radius 50b that are similar or identical to the first radius 22a and the second 22b of the plant support member 16a-c. When the radius extension 46 is urged into position over the upper end 24a or over the top of the upper portion 42 of the extension 38, it is disposed so as to maximally dispose a radius extension top 52 further away from the plant center 15a than is the bottom radius portion 48.

The extension 38 is then placed over the radius extension top 52. The top segment 26 is then placed over the extension 38. It is also possible to place one of the top segments 26 directly over the radius extension top 52.

Additional extensions 38 can, of course, be used as desired. If desired, additional radius extensions 46 can be placed one on top of the other to extend the ability to support the foliage radially away from the plant center 15a any desired amount.

Accordingly, a method to radially dispose the foliage of the plant 15 any desired amount away from the plant center 15a is provided as well as a method of supporting and securing the foliage where desired that can adapt to the continuing growth of the plant 15.

It is important to note that each of the 5-8 or more plant support members 16a-c are individually adjustable and expandable both radially and vertically. In this manner, the hydroponics plant support system 10 is adjusted at each location to accommodate the size of the plant 15.

This is superior to another possible type of design (theorized, not known) that expands an entire supporting structure because, if the plant 15 has grown substantially on only one side, according to the instant hydroponics plant support system 10 only the side that experienced the plant 15 growth would be expanded.

However, according to the other possible type of design that would result in a higher support structure that extended radially 360 degrees, the higher support structure would block access to the side of the plant 15 that actually required the additional support. This would make use of the other possible type of design more difficult to use with plants that did not exhibit uniform growth 360 degrees around the plant center 15a, as is common.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A hydroponics plant support system adapted for use in a growing medium and with a plant, comprising:
(a) a base assembly that is adapted to be disposed in the growing medium, and wherein said base assembly includes an upper support band and a lower support band that are parallel with respect to each other and disposed in a spaced apart relationship and wherein said upper support band and said lower support band of said base assembly are disposed entirely in an interior of a container, and wherein the growing medium is disposed in said container, and wherein said hydroponics plant support system is not mechanically clamped or fastened to said container, and wherein said hydroponics plant support system is not resting on any portion of an upper perimeter of said container;
(b) a plurality of plant support members that are attached to said base assembly, and wherein a lower portion of each of said plurality of plant support members is attached to said upper support band and wherein a still lower portion of each of said plurality of plant support members is attached to said lower support band, and wherein, when said base assembly is disposed in said growing medium at least one of said plant support members includes a first segment that is disposed above said growing medium and which extends said at least one of said plant support members in a substantially horizontal direction radially away from a geometric center of said container, and wherein said at least one of said plant support members includes a lower portion that is attached to said base assembly and which includes a first radius portion that is attached to said lower portion and a second radius portion, and wherein said first segment is disposed between said first radius portion and said second radius portion, and wherein said at least one of said plant support members includes an upper segment that extends upward from said second radius portion, and wherein said at least one of said plant support members includes a top segment, and wherein said top segment includes a longitudinal length and wherein said top segment includes an opening at a bottom thereof that extends substantially along a portion of said longitudinal length, and wherein said opening includes an inside diameter that is generally equal to or slightly greater than an outside diameter of said upper segment, and wherein said upper segment is able to be disposed in said opening of said top segment, and wherein said top segment is telescopically extensible with respect to said upper segment along a distance that is equal to said longitudinal length of said opening of said top segment, and including means for retaining said top segment in a position relative to said upper segment along said longitudinal length of said opening of said top segment; and (c) means for securing said plant to said at least one of said plant support members.

2. The hydroponics plant support system of claim 1 wherein said at least one of said plant support members includes all of said plant support members.

3. The hydroponics plant support system of claim 2 wherein said at least one of said plant support members includes at least five of said plant support members.

4. The hydroponics plant support system of claim 1, wherein said top segment includes at an end opposite said opening a safety cap, and wherein said safety cap includes a diameter that is greater than an outside diameter of said upper segment.

5. The hydroponics plant support system of claim 4 wherein said safety cap includes a diameter that is greater than an outside diameter of a remaining portion of said top segment along its longitudinal length.

6. The hydroponics plant support system of claim 1 wherein said top segment is maintained in position relative to said upper segment by friction between an interior of said opening of said top segment and an exterior of said upper segment.

7. The hydroponics plant support system of claim 1 including an extension, and wherein said extension includes a longitudinal extension length and a lower end that is disposed at a bottom end thereof and an upper portion that extends upward from said lower end for a predetermined distance, and wherein said upper portion of said extension is fixedly attached to said lower end of said extension, and wherein said lower end includes an opening, and wherein said opening of said lower end of said extension is adapted to be disposed over an upper end of said upper segment and wherein said upper end of said upper segment is able to be disposed in said opening of said lower end and urged therein a distance that is substantially equal to a longitudinal length of said opening of said lower end, and wherein when said opening of said lower end of said extension is fully disposed over said upper end of said upper segment a distance that is substantially equal to said longitudinal length of said opening of said lower end, a center longitudinal axis of said extension aligns with a center longitudinal axis of said upper segment.

8. The hydroponics plant support system of claim 1 wherein said at least one of said plant support members includes a radius extension that is adapted to be attached to said upper segment, and wherein when said radius extension is attached to said upper segment, said radius extension extends said at least one of said plant support members of said hydroponics plant support system a greater distance radially away from said geometric center of said container.

9. The hydroponics plant support system of claim 8, wherein said radius extension includes a bottom radius portion and wherein said bottom radius portion includes a longitudinal opening therein that is adapted to fit over said upper segment, and wherein said radius extension includes a radius extension top and wherein said radius extension top includes an outer diameter that is equal to an outer diameter of said upper segment.

10. The hydroponics plant support system of claim 1 wherein said means for securing said plant to said at least one of said plant support members includes a plant tie, and wherein said plant tie includes a flexible member and a first pad that is disposed at a first end of said flexible member and wherein said first pad includes a first half of a hook and loop fastener that is disposed at an end of said first pad that is opposite with respect to said flexible member and including a second pad that is disposed at an opposite end of said flexible member and wherein said second pad includes a second half of a hook and loop fastener that is disposed at an end of said second pad that is opposite with respect to said flexible member, and wherein said first pad and said second pad extend away from said flexible member and are adapted to adhere together when urged into contact with one-another and which are adapted to separate from one-another when pulled in opposite directions along a longitudinal axis of said flexible member at a location of said flexible member that is proximate said first pad and said second pad.

* * * * *